Nov. 15, 1932. H. STRAND ET AL Re. 18,659
TOOL
Original Filed Oct. 19, 1925 2 Sheets-Sheet 1
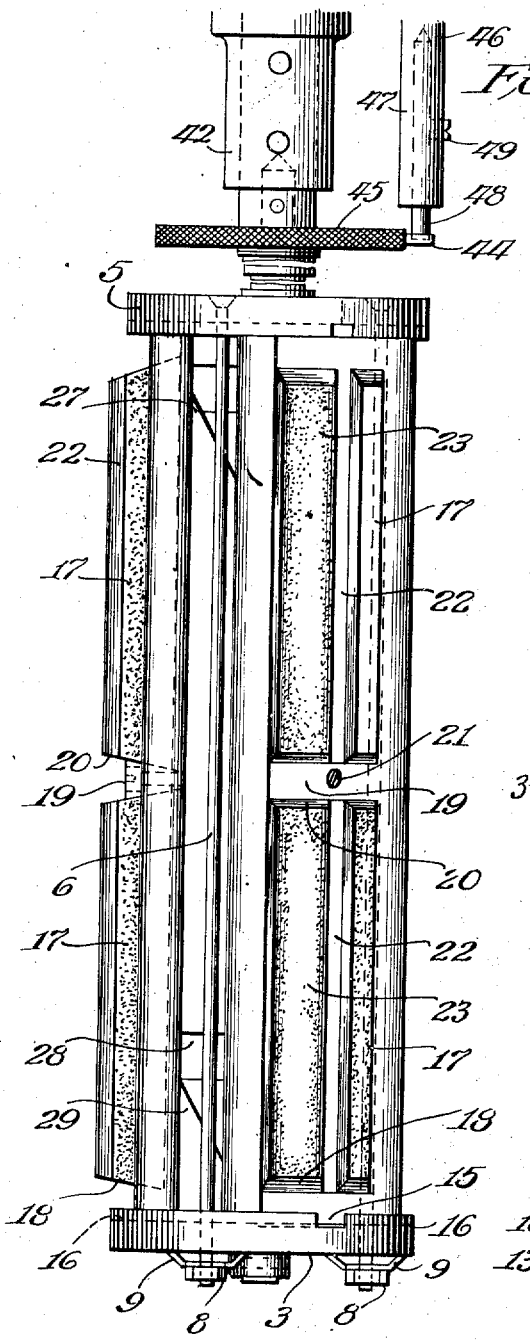
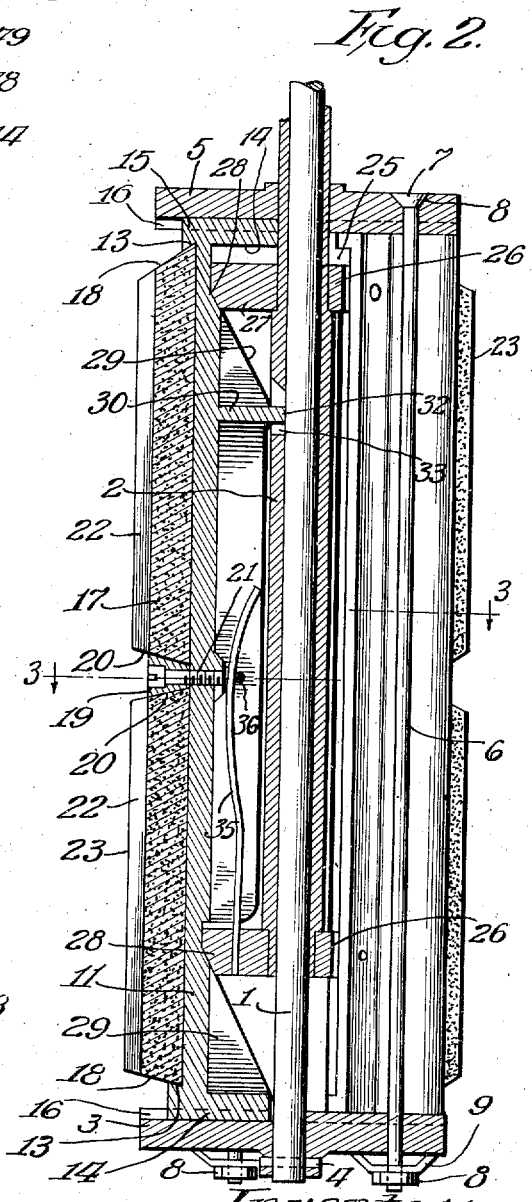
Inventors
Henry Strand and
Byron D. Jackson,
By Rector, Hibben, Davis & Macauley Attys.

Nov. 15, 1932. H. STRAND ET AL Re. 18,659
TOOL
Original Filed Oct. 19, 1925 2 Sheets-Sheet 2
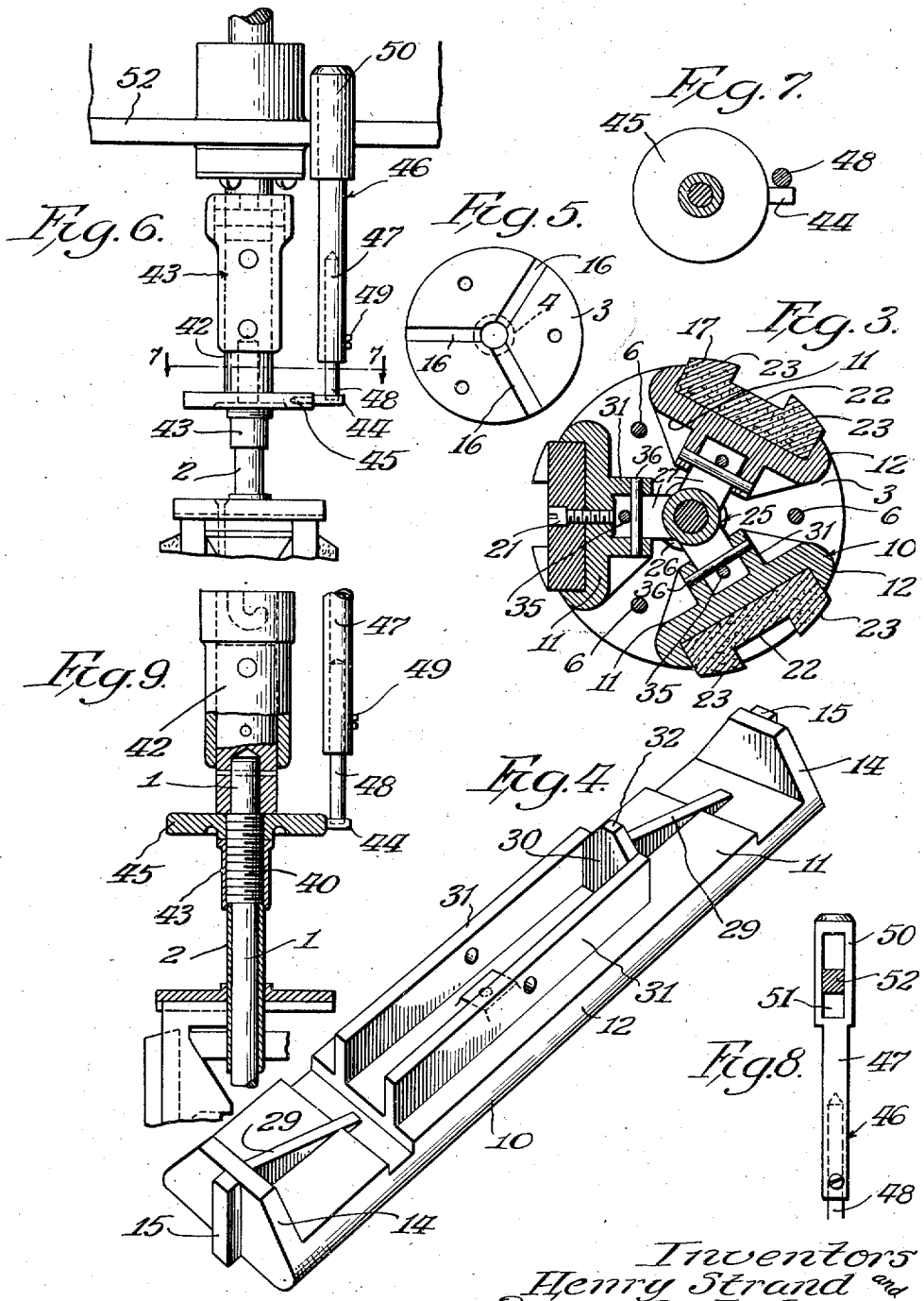
Inventors
Henry Strand and
Byron D. Jackson.
By Rector, Hibben, Davis & Macauley, Attys Reissued Nov. 15, 1932

Re. 18,659

UNITED STATES PATENT OFFICE

HENRY STRAND AND BYRON DE KALB JACKSON, OF CLEVELAND, OHIO, ASSIGNORS, BY MESNE ASSIGNMENTS, TO AUTOMOTIVE MAINTENANCE MACHINERY COMPANY, OF CHICAGO, ILLINOIS, A CORPORATION OF ILLINOIS

TOOL

Original No. 1,715,255, dated May 28, 1929, Serial No. 63,485, filed October 19, 1925. Application for reissue filed December 22, 1930. Serial No. 504,189.

This invention relates to machines for grinding or honing the cylinders of engines, such as the cylinders of the engines of automobiles, motor vehicles or the like.

The object of the invention is to provide a machine of this character embodying a novel form of expansible grinding tool wherein the grinding or honing elements are positively and automatically expanded to the proper degree during the grinding operation.

Another object is to provide a simple and compact though highly organized tool of durable construction and which is convenient and reliable in operation and easy and comparatively inexpensive to manufacture.

A further object is to provide a novel form of grinding element and a novel mounting therefor whereby the grit or the like incident to the operation is collected and whereby the grinding elements are rigidly and securely though removably held in assembly.

Other objects and advantages reside in certain novel features of the construction, arrangement and combination of parts which will be hereinafter more fully described and particularly pointed out in the appended claims, reference being had to the accompanying drawings forming a part of this specification, and in which:

Fig. 1 is a view in elevation showing a tool constructed in accordance with the principles of my invention, Fig. 2 is a view thereof in diametrical vertical section, Fig. 3 is a sectional view taken on line 3—3 of Fig. 2, Fig. 4 is a detail perspective view of one of the holders employed for each grinding element, Fig. 5 is a detail view in elevation showing one of the end plates, Fig. 6 is a view in elevation showing the power feed, Fig. 7 is a view in horizontal section on line 7—7 of Fig. 6, Fig. 8 is a detail sectional view illustrating the slip fit mounting for the abutment rod, and Fig. 9 is a fragmentary view partly in section and partly in elevation.

Referring to the drawings and more particularly to Figs. 1 to 5, inclusive, it will be seen that the tool comprises an axial shaft, 1 on which an expanding sleeve 2 is splined or otherwise slidably fitted. At the forward or lower end of the shaft 1 an end plate 3 is disposed and secured as by means of a pin 4. A similar end plate 5 for the other end of the tool is mounted on the sleeve 2. The end plates 3 and 5 are held against spreading by means of a plurality, preferably three, angularly spaced rods 6 extending longitudinally between and through the end plates. One end of each rod has a head 7 received in a countersunk opening 8 provided therefor in the end plate 5 and the end of each rod opposite its head is threaded and coacts with a nut 8 and washer 9, the washer 9 being pressed against the outer face of the end plate 3 by its nut 8 to hold the end plate 3 in position.

A plurality of holders designated generally at 10 are provided for carrying the grinding elements, the holders extending longitudinally between and being mounted on the end plates. Each holder comprises an elongated and substantially channel shaped body made up of a base wall 11 and side walls 12. At each end of the base wall 11 undercut end walls 13 are integrally formed and have integral inwardly extending lugs 14. Tongues 15 are integrally formed with the end walls 13 and lugs 14. In the assembly the tongues 15 are slidably fitted in grooves 16 formed in the confronting faces of the end plates 3 and 5 to constrain the holders to radial movements. The relative lengths of the tongues 15 and grooves 16 are such (see Fig. 2) that the holders 10 are rigidly supported throughout their range of radial movement.

The grinding elements which are of carborundum or the like consist of a pair of sections 17 mounted in the channel shaped body of each holder, the section of each element being arranged in end to end relation in their holder and having their remote beveled ends 18 forced into engagement with the undercut end walls 13 of their holder by means of a clamping block 19 having its side faces undercut and engaging the adjacent beveled faces 20 of the sections 17 under the action of a screw 21 extending through the block and threadedly engaged with the base of the holder. The sections 17 of the grinding elements have central longitudinal channels or slots 22 located between the grinding surfaces 23 of each grinding element and serving to collect grit or the like whereby to enhance the grinding action.

The holders 10 are expanded by means of two spaced expanders designated generally at 25. Each expander 25 has a hub 26 fixed on the tube 2 and provided with three integral expanding arms 27, there being one arm 27 on each expander 25 for each holder 10. The arms 27 have beveled or inclined cam surfaces 28 at their outer ends engageable with inclines 29 integrally formed with the holders 10 on their inner sides. Both inclines 29 of each holder 10 are integral with the base section of the holder on which they are mounted and one such incline 29 is also integral with a lug 14 while the other incline of the same holder is integral with a cross plate 30 formed between parallel ribs 31 provided on the underside of the base section of each holder. The cross plates 30 having inwardly tapering extensions 32 slidable in grooves 33 formed in the tube 2 to aid the tongues 15 and grooves 16 in constraining the holders to radial adjustment.

Spring means is provided for holding the inclines 29 of the holders against their expanders and comprises a blade spring 35 for each holder, each spring 35 having one end fixed to one of the arms 27 and having its opposite end portion engaged with a cross pin 36 carried by the ribs 31. The springs 35 operate between the ribs 31.

The tool described is rotated and reciprocated by the conventional power mechanism widely employed in the art and organized with this mechanism is an automatic power feed for the expanding means. As shown the shaft 1 of the tool is extended beyond the same and is coupled to the rotatable and reciprocable power drive 42. The expanding sleeve 2 is also extended beyond the tool. The extension of the shaft 1 is externally threaded at 40. A feed nut 45 is threaded on the shaft portion 40 and it has a tubular connection 43 with the sleeve 2, the tubular connection or sleeve 43 being a press fit on the sleeve 2 and loosely abutting the feed nut. A lateral pin 44 is fixed to the flange of the feed nut and is periodically engageable with the lower section of an extensible abutment rod (designated generally at 46) as the power member and tool are reciprocated and rotated. The rod 46 includes a tubular upper section 47 in which a lower section 48 is adjustably fitted. A set screw 49 holds the sections 47 and 48 in the desired adjustment. The tubular section 47 has a head 50 provided with a transverse slot 51 defined by parallel walls in the head. The slot 51 is somewhat elongated and slidably receives a squared portion 52*a* (Fig. 8) of the stationary frame 52 (Fig. 6) in such manner that the abutment rod is a slip fit on the frame, that is, the abutment rod may slide up and down but cannot swing or rotate or in other words cannot move angularly relative to the frame. By varying the length of the abutment rod the frequency of the engagement of the pin 44 with the rod 48 may be varied whereby the expansion of the grinding elements may be regulated to suit conditions. In considering the phase of the operation it must be borne in mind that the entire assembly is not only rotated but moved up and down, that is reciprocated. The slip fit between the abutment rod and the frame provides the necessary lost motion to take care of that phase of the operation wherein the pin 44 rises directly beneath and engages the lower end of the section 48 of the rod 46. Of course, when the pin 44 strikes the periphery of the lower section 48 of the rod 46 the feed nut is held for a short interval while the rest of the assembly continues to rotate, thereby advancing the feed nut on the shaft 1 and causing the sleeve 2 through the connection 43 to advance along its shaft 1 whereby to cause the expanders 25 carried thereby to expand the holders and their grinding elements to a slight extent. The engagement of the pin 44 and abutment rod occurs periodically and occupies only a short interval since the pin 44 slides down off the abutment rod when the assembly partakes of the downward phase of its reciprocatory movement. In this way the requisite expansion is carried out automatically so that an effective grinding or honing action may be had without manual attention to the expansion means.

We claim:

1. In combination, a grinding tool including a drive shaft, grinding elements carried by the shaft adapted for radial movement with respect to the shaft, a sleeve slidable upon the shaft, means whereby with longitudinal movement of the sleeve in one direction the same will impart outward movement to the grinding elements, and means for imparting intermittent longitudinal movement to the sleeve.

2. In a device of the character described, a rotatable body, means for rotating the body, radially movable grinding elements carried by the body, and means including relatively rotatable parts governed by the rotational movement of said body for intermittently imparting radial outward movement to the grinding elements.

3. In a device of the character described, a rotatable body, a plurality of radially disposed grinding elements carried by the body, a sleeve longitudinally movable between the grinding elements, and means operable incident to slidable movement of the sleeve in one direction to shift the grinding members in an outward radial direction, and means for intermittently imparting slidable movement to the sleeve.

4. In combination, a rotatable body, a plurality of radially movable abrasive elements supported thereby, a drive shaft passing centrally through and attached to the body, a sleeve slidable on the shaft, means for automatically feeding the sleeve in a longitudinal direction, and cooperating means between the sleeve and abrasive elements for feeding them gradually in an outward direction.

5. In a grinding device, a pair of parallel end plates rigidly connected together, abrasive carrying members supported between the plates for radial movement, inclined members on the inner faces of the abrasive carrying members, a longitudinally movable expansion member arranged between the abrasive carrying members, means for intermittently feeding the expansion member in one direction, and bevelled expanding elements carried by the expansion member and movable over the inclined members, whereby to gradualy feed the abrasive carrying members in an outward direction incident to the movement of the expansion member in one direction.

6. In a device of the class described, a body, means for rotating the body at a comparatively fast rate of speed, radially-movable grinding elements carried by the body, and means including a non-rotative adjusting element operative by and under the control of the rotative movement of said body for intermittently imparting radial expansion movement to the grinding elements while the grinding operation is in progress.

7. In a device of the class described, a body, means for rotating the body, radially-movable grinding elements carried by the body, and means including relatively rotatable elements controlled by the rotational movement of said body for automatically imparting radial expansion movement to the grinding elements.

8. In a device of the character described, a body adapted to be rotated and reciprocated, means for transmitting said movements to said body, radially movable grinding elements carried by said body, and means including a part non-rotatable and operative under the control of the rotary motion of said motion-transmission means for automatically imparting radial outward movement to said grinding elements while said body is being reciprocated and rotated.

9. In a cylinder grinding tool, a frame formed with radial passageways, grinding elements mounted in said passageways for radial expansion and contraction movements, a rotatable drive member connected to said frame for rotation of the latter during the grinding operation, means directly associated with said grinding elements for effecting radial expansion of the same, an adjusting member associated with said drive member and normally rotatable therewith and adapted to be rotated relatively to said drive member, a connection between said radial expansion means and said adjusting member, and means including a non-rotatable member for utilizing the rotary motion of said drive member to accomplish said relative rotation for operating said adjusting member to expand said grinding elements while the grinding operation is in progress.

10. In combination, a grinding tool including a drive shaft rotatable in grinding operation, grinding elements carried by said shaft and adapted for radial movement with respect to said shaft, an adjusting member mounted upon said shaft for movement therewith and relative thereto, means whereby movement of said member in one direction relative to said shaft will impart outward radial movement to said grinding elements, and means including a separate non-rotative part for utilizing the rotary movement of said drive shaft for moving said member in said one direction while the grinding operation is in progress.

11. In a grinding device, a pair of parallel end plates rigidly connected together, abrasive carrying members supported between the plates for radial movement, inclined elements on the inner faces of the abrasive carrying members, an expansion member arranged between and giving support to the abrasive carrying members, means for imparting grinding motion to said plates, members and elements, means including a part rotatable relative to said motion means and a non-rotatable part governed by the grinding motion of the hereinbefore mentioned plates, member and elements for moving said expansion member in one direction, said expansion member having beveled expanding surfaces movable over said inclined elements, whereby to gradually feed the abrasive carrying members in an outward direction incident to the movement of the expansion member in one direction.

12. In a cylinder-grinding tool, the combination of a frame-cage comprising end-plate members having radial grooves in their confronting surfaces extending from the center thereof to the outer edge thereof; side-bars securely engaged with said end-plates; stone-carriers arranged between said side-bars, each said stone-carrier having stone-receptive provision on its outer edge and at its ends having projecting guide-tongues engaged directly in the grooves of the end-plates, said guide-tongues being long enough radially to extend substantially throughout the length of said grooves whereby the stone-carriers are rigidly guided and supported by said end-plates throughout the range of radial movement of said stone-carriers; spring means for contracting said stone-carriers; and axially-arranged, adjustable wedge-means arranged axially of said frame-cage and coacting with said stone-carriers to spread them radially.

13. In a cylinder-grinding tool, the combination of a frame-cage comprising a pair of spaced end plates each having a plurality of radial grooves extending from their center to their outer edges, a plurality of spaced connecting bars secured to and rigidly connecting said end plates, means directly connected to one of said end plates for driving said frame cage, carrier devices rigidly supporting abrasive means and mounted in said frame-cage between said connecting bars, said devices having defined end tongues which snugly and slidingly fit into said end plate grooves to provide guidance and lateral support for said carrier devices throughout their range of movement in said grooves, a support mounted axially within said frame cage, and conical devices mounted upon said support with their smaller diameter ends projected toward said drive-connected end plate, said carrier devices having surfaces shaped complementally to said conical devices and engaged by the latter to expand said carrier devices.

14. In a device of the character described, a plurality of parts normally rotatable together which include a body, radially movable abrasive supports carried by said body, and means for expanding said supports including a member also rotatable relative to said body; and separate non-rotatable means engageable with said member as said rotatable parts are rotated for effecting said relative rotation between said member and body.

15. In a tool of the class described, a body, a plurality of abrading elements supported by said body for radial expansion or contraction movement, means supported by said body and engaging said elements for effecting expansion thereof and for limiting contraction movement thereof, a rotatable drive member connected to said body for rotating the latter, an adjusting member rotatable with and relative to said drive member and connected to said first means, and additional means normally stationary and adapted to engage said adjusting member while said drive member and body are rotating to effect said relative rotation between the drive member and adjusting member to expand said abrading elements.

16. In a device of the class described, the combination of a frame cage comprising end plates having grooves in their confronting surfaces extending from the center thereof to the outer edge thereof, a plurality of bars securely engaged at their ends with said end plates, rectangularly-shaped members mounted between said bars and having their outer longitudinal edges adapted for engagement with the surface to be treated, each said member having at its ends projecting guide tongues engaged directly in the grooves of said end plates, said guide tongues being long enough to extend radially substantially throughout said grooves for rigid, guided support of said members solely by said end plates throughout the range of radial movement of said members, adjustable wedge means arranged axially of the frame-cage and against which said members are seated for radial expansion of said members, means for adjusting said wedge means, and spring means holding said members contracted and seated against said wedge means.

17. In a cylinder grinder, a series of grinding stones arranged for expansion or contraction about a common axis to vary the grinding diameter of the stones, means to expand said stones toward the work, a drive shaft for the grinder, and brake-operated means adapted to be applied during rotation of the grinder for driving said expanding means from the drive shaft of the tool.

18. A cylinder grinder comprising a hollow body member, radially expansible abrading members mounted thereon, means for expanding, said members toward the work, means for rotating the grinder, a driving connection between said grinder-rotating means and said expanding means, and means to put said driving connection into and out of operation.

19. In a cylinder grinding mechanism, abrading means, a member for driving said abrading means in rotary direction, and means for adjusting said abrading means toward and from the cylinder surface to be ground without removing said means from the cylinder and while the grinding operation is in progress, said latter means including a pressure element associated with said abrading means, a manually operable and exteriorly accessible device associated with said drive member and rotatable therewith and relative thereto, and a connection between said pressure element and said device.

20. In a cylinder grinding mechanism, abrading elements, a support for said elements, drive means for imparting motion to said support, a drive connection between said drive means and said support, and means for adjusting said elements toward and from the surface to be ground including an adjusting device associated with said drive and arranged for rotary movement therewith and relative thereto, a connection between said device and said elements, and a friction member associated with said device and adapted to frictionally engage the latter to retard or stop its rotary movement to effect relative rotary movement between said device and drive connection to adjust said elements relative to the surface being ground while the mechanism is in motion and without removing said elements from the cylinder being ground.

21. In a grinding tool, the combination of a hollow mandrel, radially expansible abrading members mounted thereon, a device in the mandrel to expand said members, a driving shaft operatively connected to the mandrel, and means to drive said expanding device from the shaft, said means deriving its motion from the driving shaft of the mandrel.

22. In a device of the class described, a rotatable frame having spaced end plates, a drive shaft passing centrally through said frame and connected to the bottom end plate, abrasive carriers supported by said end plates, and means for expanding and contracting said carriers including a sleeve surrounding said drive shaft, adjusting elements supported by said sleeve and engaging said carriers, and means for moving said sleeve relative to said drive shaft to move said elements axially to expand said carriers.

23. In a device of the class described, a rotatable frame having spaced end plates with grooves therein, a drive shaft passing centrally through one of said end plates and drive connected to the other of said plates, abrasive carriers having end portions supported in the grooves of said end plates, and means for expanding and contracting said carriers including a sleeve surrounding said drive shaft, adjusting elements supported by said sleeve and engaging said carrier, and means for adjusting said sleeve to move said elements axially of said frame to expand said carriers.

24. In a tool of the class described, a rotatable frame, a plurality of expansible and contractible abrasive elements mounted in said frame, a drive shaft passing centrally through said frame and having drive connection therewith, a sleeve surrounding said shaft within said frame, adjusting elements carried by said sleeve and having cooperative engagement with said abrasive elements to expand the latter as said adjusting elements are moved axially of the frame, and means for moving said sleeve relative to said drive shaft to effect axial movement of said adjusting elements.

25. In a tool of the class described, a rotatable frame having top and bottom end plates spaced apart by post members defining radial passageways, abrasive carriers mounted in said passageways, a drive shaft passing freely through said top end plate, centrally through said frame and rigidly connected to said bottom end plate, carrier expanding devices having inclined surfaces engaging complementally-shaped surfaces on said carriers, a sleeve surrounding said drive shaft within said frame and supporting said expanding devices, and means for moving said sleeve relative to said drive shaft to move said devices axially of said frame to expand said carriers.

26. In a tool of the class described, the combination of a frame-cage having end plates with aligned grooves in their confronting faces extending from their outer edges inwardly a substantial distance, spaced bar members supporting said plates in spaced relation, carrier members mounted between said bar members and supporting wall-engaging elements, said carrier members having end portions guidingly-supported in said grooves, adjustable wedge means mounted axially of said frame-cage and coacting with said carrier members to spread them radially, means for adjusting said wedge means, and spring means for contracting and holding said carrier members in engagement with said wedge means.

27. In a device of the class described, the combination of a frame-cage having end plates with aligned grooves in their confronting faces, a plurality of circumferentially spaced posts having their ends engaged with said end plates for supporting the latter in spaced relation and defining radial passageways, wall-engaging members mounted in said passageways and having their ends slidably seated in said grooves for sole guidance and support of said members in expansion and contraction movements, adjustable wedge means disposed axially of said cage-frame in engagement with said carrier members for limiting the extent of contraction of the later, means for adjusting said wedge means to vary the position of said carrier members in said passageways, and spring means holding said carrier members in engagement with said wedge means.

HENRY STRAND.
BYRON DE KALB JACKSON.